INVENTOR
William J. Wrighton
BY
Harry H. Styll.
ATTORNEY

Patented Feb. 16, 1926.

1,573,023

UNITED STATES PATENT OFFICE.

WILLIAM J. WRIGHTON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

PROCESS FOR PRODUCING OPHTHALMIC MOUNTINGS.

Application filed September 2, 1924. Serial No. 735,427.

*To all whom it may concern:*

Be it known that I, WILLIAM J. WRIGHTON, a citizen of the United States, residing at Southbridge, in the county of Worcester and State of Massachusetts, have invented certain new and useful Improvements in Processes for Producing Ophthalmic Mountings, of which the following is a specification.

This invention relates to improvements in nonmetallic ophthalmic mountings and more particularly to an improved process of producing nonmetallic ophthalmic mountings of celluloid.

In the optical trade there is a great demand for spectacle frames simulating tortoise shell in appearance and practically all of such ophthalmic mountings are made of a cellulose composition material such as zylonite or some other equally light weight nonmetallic composition. Such materials as have heretofore been used have had certain undesirable properties, the principal one being the tendency to return to its original shape after being bent. This property is particularly undesirable in connection with ophthalmic temples which have to be bent in order to properly fit the person wearing the same and naturally the bent shape must be retained in order that the lenses of the mounting will be properly positioned before the eyes.

A great deal of experimentation has been done in order to devise mountings of this general character which may be readily adjusted and which may be relied upon to maintain the adjustment so given them, but it has been found that it was a practical necessity to insert a metallic core through the full length of the temple in order that it should meet the requirements laid down for it. Of course, the additional material and the labor involved in inserting such a metallic core has increased the cost of the finished product. Furthermore, unless the zylonite or other nonmetallic material from which temples are so made is very dark, the inner core will be noticeable; which also is undesirable.

I have found that with my invention, I can produce an ophthalmic mounting which will be bent in any desirable form and which will absolutely maintain the shape so given it.

One of the principal objects of my invention is to provide an improved process for producing zylonite products, particularly ophthalmic temples which may be bent to any shape desired and which may be relied upon to maintain the shape so given them.

Another object of my invention is to provide an improved process for the manufacture of bent zylonite parts whereby the internal strains set up by bending operations will be driven off.

Still another object of my invention is to provide such an improved process whereby the article is quickly seasoned.

Another object of my invention is to provide an improved ophthalmic temple made in accordance with my process.

Other objects and advantages should be apparent from the following description taken in connection with the accompanying drawings which it is to be understood are simply illustrative.

In the drawings forming a part of this application:

Similar reference characters designate corresponding parts throughout the several views.

Figure 1:
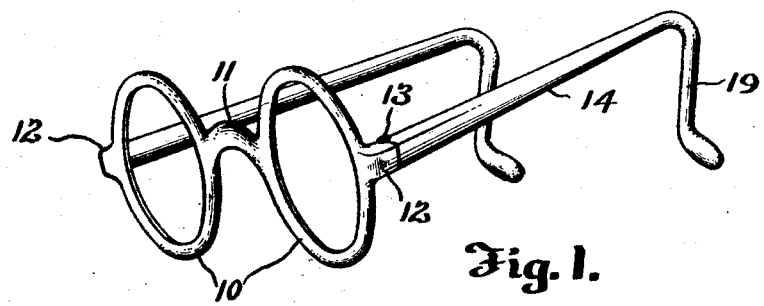
Figure 1 is a perspective view of a spectacle frame and a pair of temples made in accordance with my invention.
Figure 2:
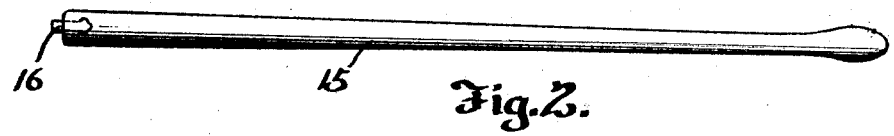
Figure 2 is a side elevation of a partly finished temple.

In Figure 1 I have shown an ophthalmic mounting comprising a pair of lens rims 10 connected by a suitable bridge member 11 and provided on their opposite sides with end pieces 12. To the end pieces are pivoted in any desirable manner as at 13, the temples 14. As best shown in Figure 2 I form the temples by producing a strip of zylonite or other nonmetallic material strip 15. At the forward end of the blank 15 I secure any suitable hinge member 16 by which the temple is adapted to be fastened to the end piece member 12. The strip 15 is entirely finished so far as its cross sectional configuration is concerned and it may be of a rectangular shape with the corners rounded at its forward end and preferably tapering to a substantially circular cross section at the rear end.

Figure 3:
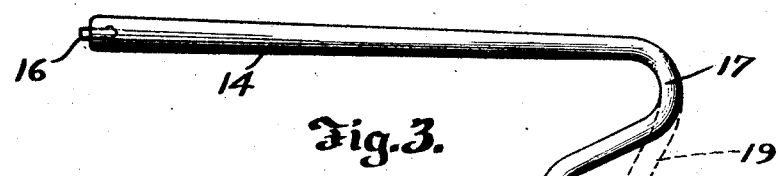
Figure 3 shows a temple after being bent.
Figure 4:
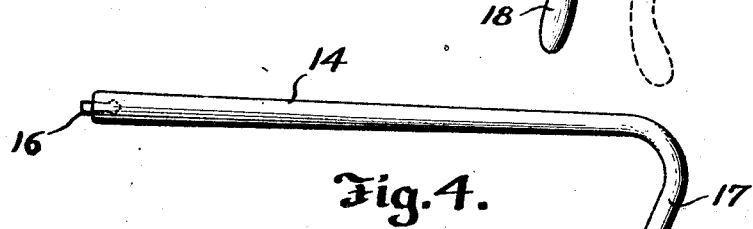
Figure 4 is a view similar to Figure 3, showing a finished temple after the seasoning operation.

After the blank 15 is given the proper finishing I first heat it and then bend the rear end sharply as at 17 in Figure 3, this bending being of a greater degree than that required in the finished article and preferably I provide the very extremity of the temple with a second bend 18 while heated as clearly shown. The sharp bending operation sets up certain internal strains in the material and I have found that it is due to the presence of these strains that the ordinary zylonite returns to its original shape rather than to maintain the given shape.

The next step in my process consists in quickly seasoning the temple bent as in Figure 3, and by so seasoning it the internal strains set up at the bends 17 and 18 are driven off. The seasoning operation may be accomplished by any method of heating, such as by baking in an oven or otherwise exposing the temple to the action of dry, hot air for a period of approximately 48 hours. I have found that I obtain good results by having the temperature of the seasoning air maintained constantly at from 160 to 190 degrees F. This quick seasoning operation tends to return the temple to its initial shape but in view of the fact that it is accomplished with comparative quickness it does not go beyond the dotted line 19 in Figure 3, which is the shape of the finished temple by regulating the heating and the time thereof the bent portion will be made to return to the desired final position when the heating may be stopped and the part removed.

Figure 5:
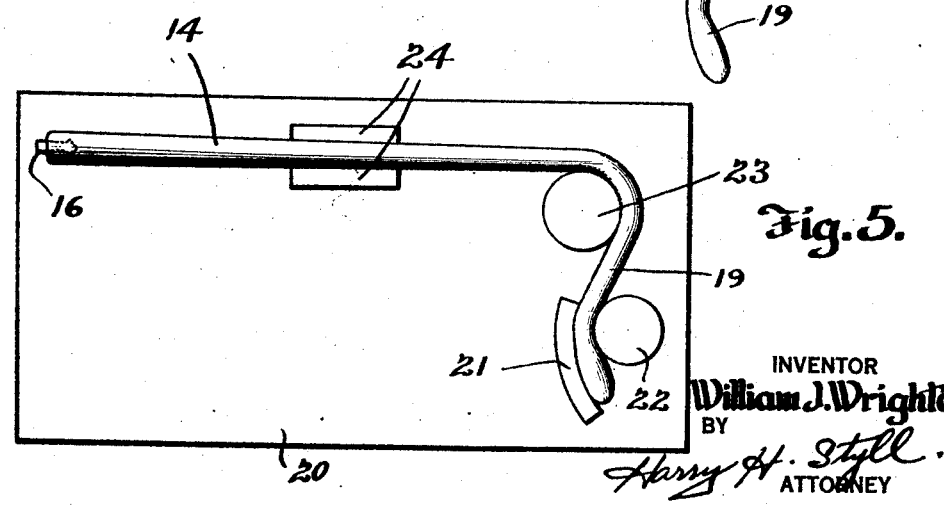
Figure 5 illustrates a modification wherein the temples are rigidly held to their given shape during the seasoning operation.

In Figure 5 I have shown a modification wherein I provide a jig formed of a base plate 20 and the shape retaining members 21, 22, 23 and 24. I may find it desirable to insert my temple in this jig so that the ear engaging portion 19 and the straight side portion 14 are normally held during the seasoning operation, in other words, I apply my temple in this jig and place jig and temple together in the furnace or other tempering means. When I use such a shape retaining jig I find that I can form my temple to the exact finished shape desired and that when the seasoning operation is completed there will be no tendency to spring out.

From the foregoing, it will be apparent that I have provided an improved ophthalmic mounting which will be more desirable than similar prior art devices in view of the fact that it will maintain the shape to which it is bent. Of course, a great many temples are manufactured at the same time in the factory and then each one has to be individually fitted to the person wearing same, the fitting operation requiring slight bending. Due to the fact that the article made in accordance with my process has been over-bent and the resultant internal strains driven off by the quick seasoning operation the device is readily adapted to be fitted and it will maintain any slight bend that is put in it by the optician. Obviously, changes may be resorted to in the details and arrangement of the steps in my process and I herein reserve the right to make such changes falling within the scope of the appended claims without departing from the spirit of my invention.

Having thus described my invention, I claim:

1. The process of shaping a celluloid part of an ophthalmic mounting comprising heating the part, bending the heated portion to a position beyond the required position and subjecting the bent part to heat until the bent part assumes the desired position through the action of the heat, said heat being higher in temperature than that to which the part is subjected during use.

2. The process of shaping a celluloid part of an ophthalmic mounting comprising heating the part, bending the heated part to a position beyond the required position and subjecting the bent part to heat until the bent part assumes the desired position through the action of the heat, then removing the part from the action of the heat, said heat being higher in temperature than that to which the part is to be subjected during use.

WILLIAM J. WRIGHTON.